(12) United States Patent
Slane

(10) Patent No.: US 6,446,196 B1
(45) Date of Patent: Sep. 3, 2002

(54) METHOD APPARATUS AND COMPUTER PROGRAM PRODUCT INCLUDING ONE-OF AND ONE-OF-AND-JUMP INSTRUCTIONS FOR PROCESSING DATA COMMUNICATIONS

(75) Inventor: Albert Alfonse Slane, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/251,837

(22) Filed: Feb. 17, 1999

(51) Int. Cl.[7] .............................. G06F 9/44; G06F 9/42; G06F 9/32; G06F 9/38
(52) U.S. Cl. .................. 712/234; 712/236; 712/226; 712/227; 712/230; 712/242; 712/243; 709/102
(58) Field of Search .................. 710/52, 56, 261; 717/5, 7, 8; 705/19; 370/503, 907; 707/103, 10, 3; 711/235, 240, 245, 204, 133, 236, 213, 145, 128, 158; 712/237, 209, 211, 207, 238, 23, 233, 234, 41, 228, 208, 236, 226, 230, 227, 241, 245, 242, 243; 714/38; 345/333, 356

(56) References Cited

U.S. PATENT DOCUMENTS 5,546,522 A * 8/1996 Nishida et al. .............. 345/353
5,764,941 A * 6/1998 Goto et al. .................. 712/209

* cited by examiner

Primary Examiner—Daniel H. Pan
(74) Attorney, Agent, or Firm—Joan Pennington

(57) ABSTRACT

A method, apparatus and computer program product are provided including one-of and one-of-and-jump instructions for use with processing data communications in a communications system. A one-of instruction is evaluated. Responsive to the one-of instruction control, a next instruction pointer is generated. A one-of-and-jump instruction is evaluated. Responsive to the one-of-and-jump instruction control, a first next instruction pointer and a second next instruction pointer are generated. The second next instruction pointer is a destination instruction pointer for the one-of-and-jump instruction.

9 Claims, 7 Drawing Sheets

METHOD APPARATUS AND COMPUTER PROGRAM PRODUCT INCLUDING ONE-OF AND ONE-OF-AND-JUMP INSTRUCTIONS FOR PROCESSING DATA COMMUNICATIONS

FIELD OF THE INVENTION

The present invention relates generally to the data processing field, and more particularly, relates to a method, apparatus and computer program product including one-of and one-of-and-jump instructions used with an embedded processor for processing data communications in a communications system.

DESCRIPTION OF THE RELATED ART

Asynchronous Transfer Mode or ATM is a communication technology whose use is becoming more widespread in some areas while receiving competition from Gigabit Ethernet and Packet Over SONET (POS) in other areas. When the above environments are combined in a single adapter, problems result. In a communications adapter that supports a Packet over SONET physical bus called POS-PHY both cell based protocols and packet based protocols are supported. In addition to both types of protocols, multiple physicals are attached to the bus. Also multiple cell sizes are supported. In this environment, it is necessary to make various different calculations to complete receive and transmit functions for a variety of operational modes.

A need exists for an effective mechanism for making various different calculations for use with processing data communications in a communications system.

SUMMARY OF THE INVENTION

A principal object of the present invention is to provide a method, apparatus and computer program product for processing data communications in a communications system.

In brief, a method, apparatus and computer program product are provided including one-of and one-of-and-jump instructions for use with processing data communications in a communications system. A one-of instruction control is evaluated. Responsive to the one-of instruction control, a next instruction pointer is generated. A one-of-and-jump instruction is evaluated. Responsive to the one-of-and-jump instruction control, a first next instruction pointer and a second next instruction pointer are generated. The second next instruction pointer is a destination instruction pointer for the one-of-and-jump instruction.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
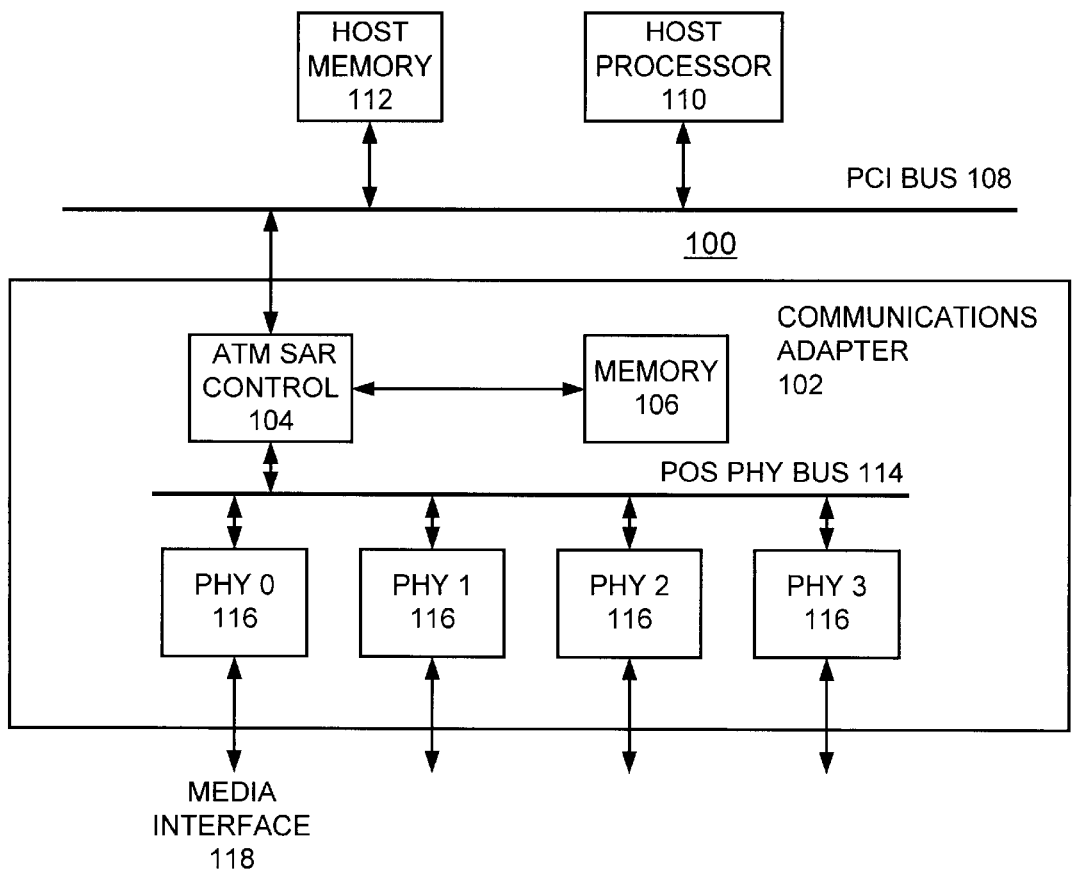
FIG. 1 is a block diagram representation illustrating a communications adapter of the preferred embodiment.

Having reference now to the drawings in FIG. 1, there is shown a communications system generally designated by 100 including a communications adapter generally designated by 102 and arranged in accordance with the preferred embodiment. As shown in FIG. 1, adapter 102 includes an ATM segmentation and reassembly control 104 of the preferred embodiment. The ATM SAR control 104 is coupled to or includes a local memory 106. As shown, the ATM SAR control 104 is connected to a peripheral component interconnect (PCI) bus 108 coupled to a host processor 110 and a host memory 112. The ATM SAR control 104 is connected by a packet over SONET (POS) physical bus 114 to a plurality of physical (PHY) layer 116. Each of the multiple physical layers 116 is connected to a respective media interface 118. Adapter 102 provides interface and translator functions between the PHY layers 116 and the peripheral component interconnect (PCI) bus 108. Adapter 102 is illustrated in simplified form sufficient for an understanding of the present invention.

Figure 2A:
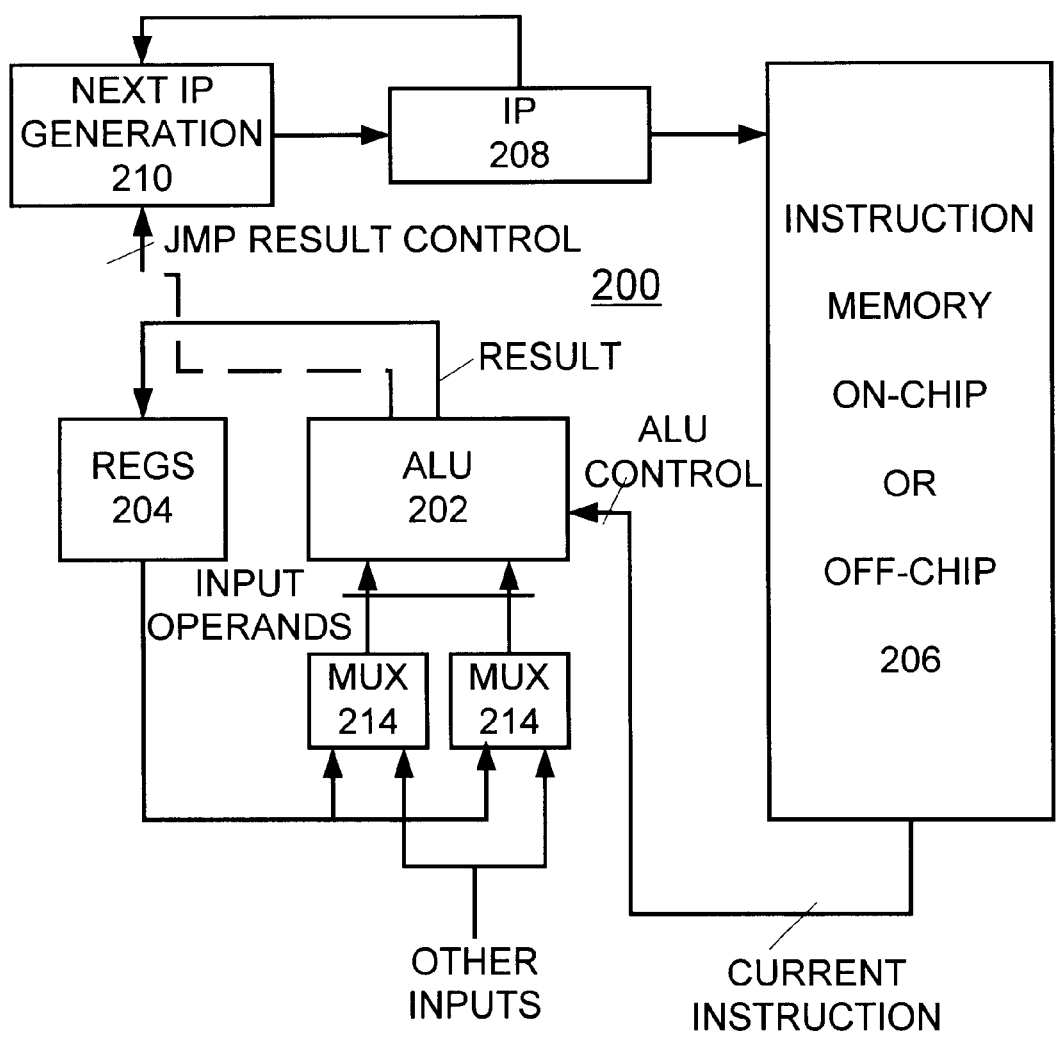
FIG. 2A is a schematic diagram representation illustrating a nano-processor apparatus for data communications processing of the preferred embodiment.

In accordance with features of the invention, data communications processing is easy to implement with a nano-coded processor structure 200 of FIG. 2A executing the one-of (ONEOF) and one-of-and-jump (ONEOFJ) instructions of the preferred embodiment. Each of the one-of (ONEOF) and one-of-and-jump (ONEOFJ) instructions executes in a single cycle. Using the one-of (ONEOF) and one-of-and-jump (ONEOFJ) instructions compresses required instruction code space and is easy for a user to use and understand. The ONEOF instruction specifies the parameters necessary to specify a jump condition, for example, jump on equal. The operands of the one-of-and-jump ONEOFJ instruction are the same, with the addition of a jump destination. The ONEOFJ instruction also allows the user to jump to a different code location, not just the instruction after the final one of instruction.

FIG. 2A illustrates the nano-coded embedded processor architecture or structure generally designated by 200 included within the ATM SAR control 104 and arranged in accordance with the preferred embodiment. Nano-coded embedded processor architecture 200 includes an arithmetic logic unit (ALU) 202 and a plurality of registers 204. An on-chip or off-chip instruction memory 206 provides a current instruction ALU control input to the ALU 202. Nano-coded embedded processor architecture 200 includes an instruction pointer (IP) register 208 and a next instruction pointer (IP) generation structure 210 of the preferred embodiment. As shown in FIG. 2A, nano-coded embedded processor architecture 200 includes a pair of multiplexers 214 coupling other inputs, such as data memory and the like, and outputs of register 204 as input operands to ALU 202.

Communications adapter includes at least one nano-processor 200 that runs nano-programs to complete receive and transmit functions needed to receive and transmit data from and to the network. Each nano-processor 200 is small and fast, having limited code space due to silicon size restrictions of the chip 100. For example, some programs must be as small as 32 instructions, while providing maximum function to support multiple frame formats from multiple physical devices.

As part of data communications processing, the small, fast nano-coded embedded processor structure 200 executes instructions of the preferred embodiment including a one-of (ONEOF) instruction and a one-of-and-jump (ONEOFJ) instruction. The next instruction pointer (IP) generation structure 210 of the preferred embodiment is illustrated and described with respect to FIG. 2B. The methods of processing the one-of (ONEOF) instruction and the one-of-and-jump (ONEOFJ) instruction the preferred embodiment are illustrated and described with respect to FIGS. 3, 4 and 5.

Figure 2B:
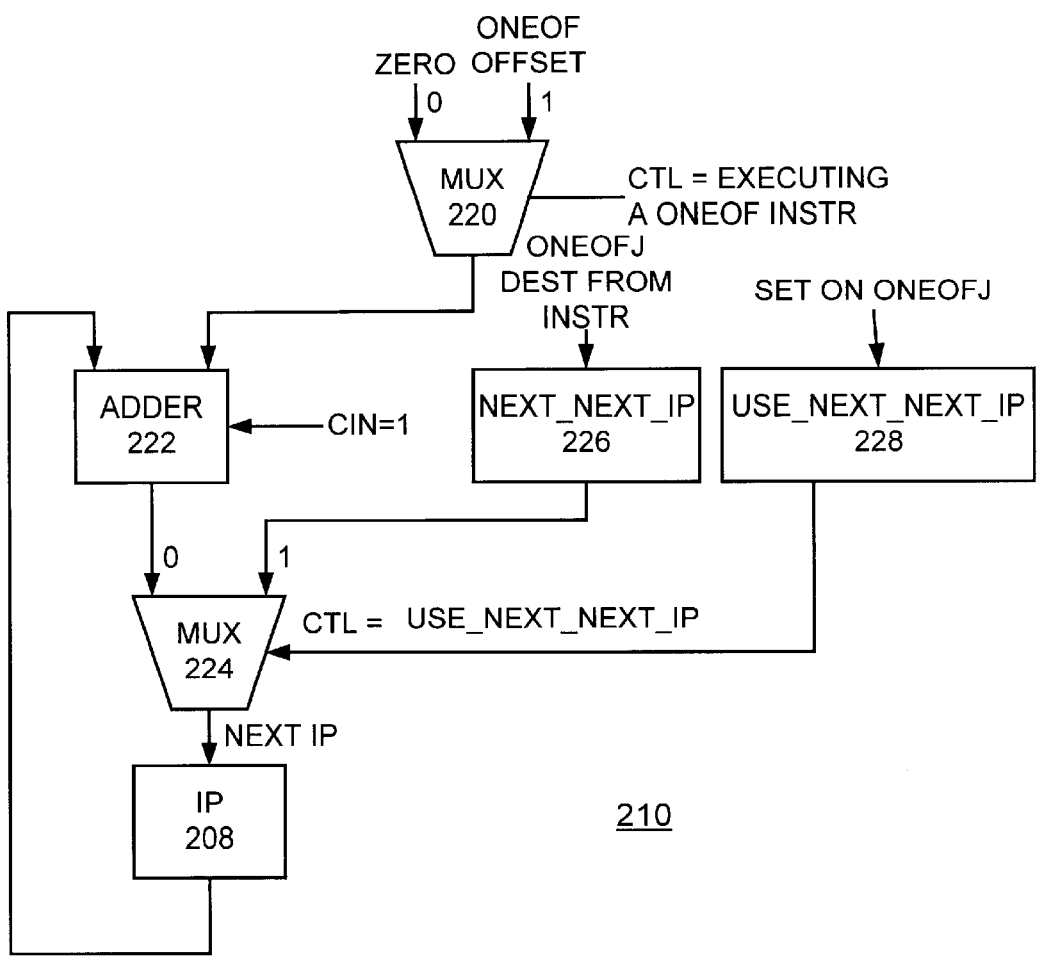
FIG. 2B is a schematic diagram representation illustrating a next instruction pointer (IP) generation apparatus for data communications processing of the preferred embodiment.

Referring now to FIG. 2B, next instruction pointer (IP) generation structure 210 of the preferred embodiment includes a first multiplexer (MUX) 220 receiving a zero false input and a ONEOF offset true input. A true control input of multiplexer 220 equals executing a ONEOF instruction. Next instruction pointer (IP) generation structure 210 includes an adder 222, a second multiplexer (MUX) 224, a next_next IP register 226 and a latch 228. A zero or a ONEOF offset output of multiplexer 220 is added with the value of instruction pointer (IP) 208 by adder 222 receiving a carry in (CIN) of one input, indicated at a line CIN=1. The result of adder 222 is applied to a zero, false input of second multiplexer 224. The ONEOFJ destination from instruction value of next_next_IP 226 is applied to a one, true input of second multiplexer 224. A true control input equals use_next_next_IP is applied to second multiplexer 224 by latch 228 receiving a set on ONEOFJ input. The second multiplexer 224 provides the next IP to IP 208.

There is a great deal of redundancy in the code requirements to complete receive and transmit functions. The one-of (ONEOF) and one-of-and-jump (ONEOFJ) instructions enables effectively and efficiently providing minimal changes between the different code requirements for different device types. For example, cyclic redundancy checking (CRC) validation code may be the same for two different formats with the exception of the starting offset and number of bytes for the CRC calculation.

In the code required for processing data communications, a large number of sequences like the following example sequence are needed:

if cond then
    do x
  else
    do y

This example sequence can be implemented using a traditional code sequence as set forth in the following TABLE 1:

TABLE 1

CONVENTIONAL CODE SEQUENCE jmp cond,do_x
          instr_y
          jmp around_x
  do_x:   instr_x
  around_x:next_instr Using two new instructions called ONEOF (One-Of) and ONEOFJ (One-Of-and-Jump) of the preferred embodiment enables both a reduced number of instructions and a reduced execution time.

Figure 3:
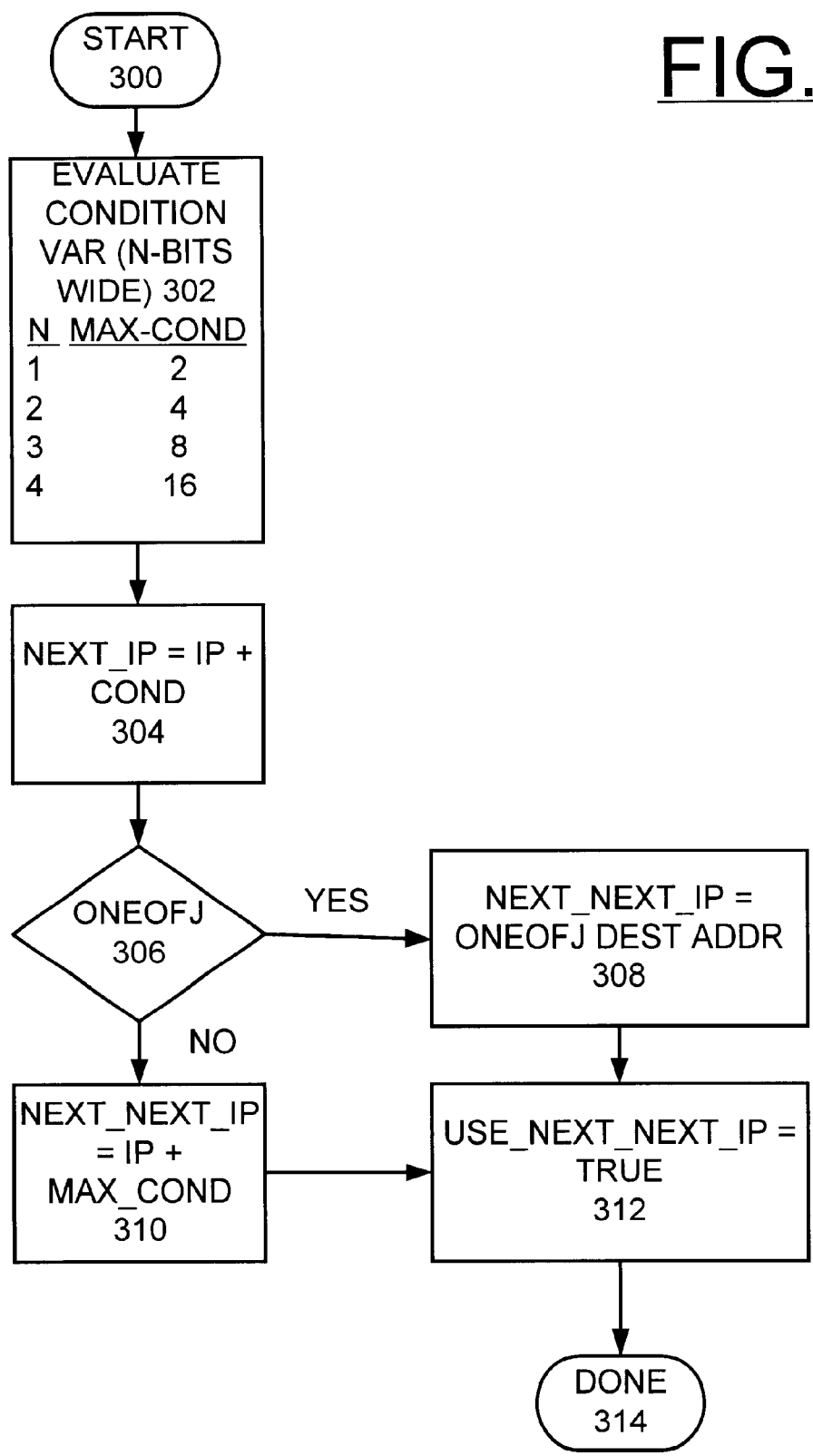
FIG. 3 is a flow chart illustrating exemplary steps performed by the nano-processor apparatus for data communications processing of the preferred embodiment.

FIG. 3 illustrates an exemplary general sequence performed by the nano-processor apparatus 200 for data communications processing of the preferred embodiment starting at a block 300. First a condition variable (VAR) is evaluated as indicated at block 302. The condition variable is N-bits wide and the MAX-COND is equal to $2^N$. Where N equals 1, a MAX-COND of 2 is provided for a basic 2-way ONEOF instruction. Where N equals 2, a MAX-COND of 4 is provided. The next instruction pointer NEXT_IP is updated to the IP+COND as indicated at block 304. Checking for a ONEOFJ is performed as indicated at decision block 306. If true, the next instruction pointer NEXT_NEXT_IP is updated to the ONEOFJ destination address as indicated at block 308. If not true, the next next instruction pointer NEXT_NEXT_IP is updated to the IP+MAX_COND as indicated at block 310. Then USE_NEXT_NEXT_IP is set to true as indicated at block 312.

Figure 4:
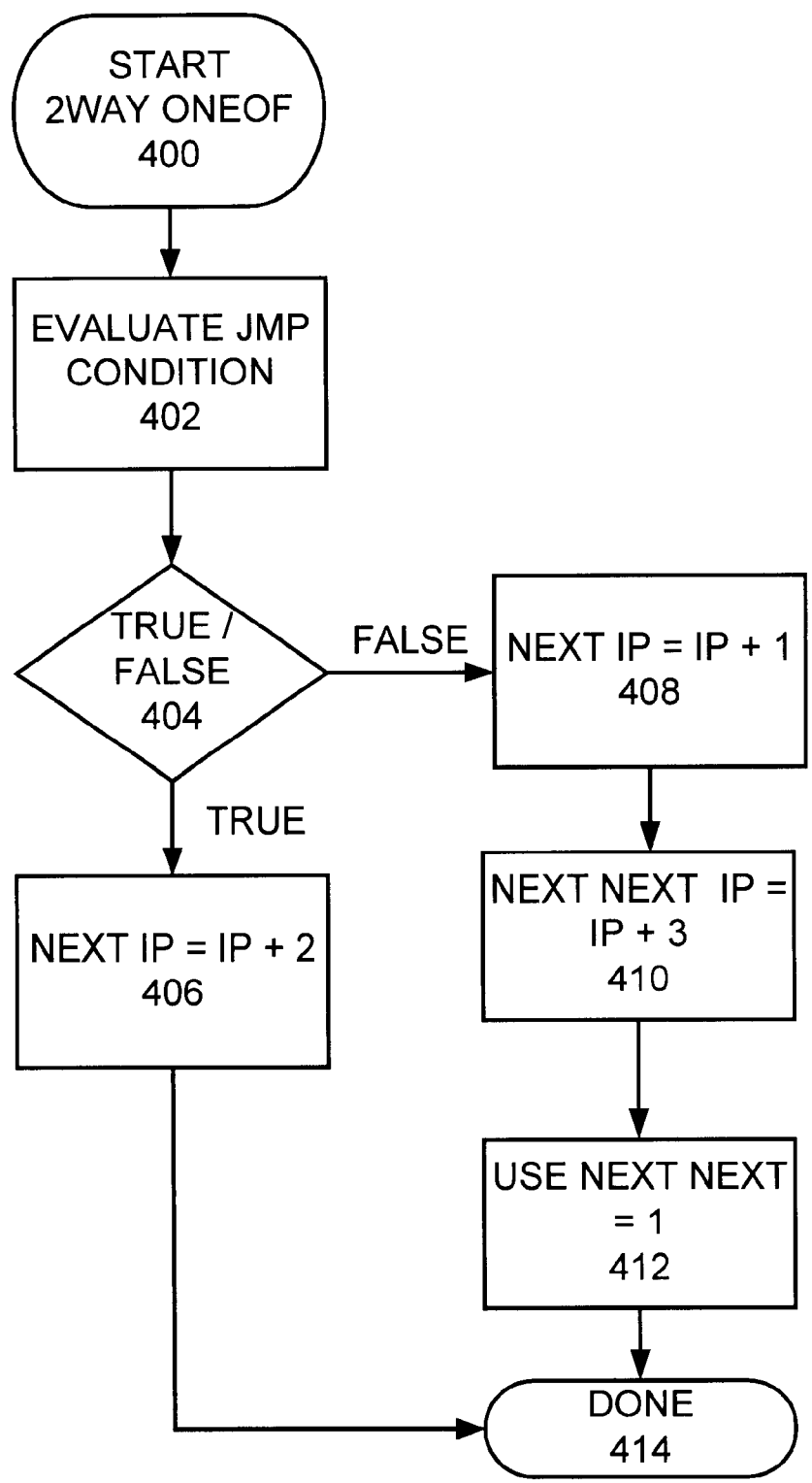
FIGS. 4 and 5 are flow charts illustrating exemplary steps performed by the nano-processor structure in accordance with one-of and one-of-and-jump instructions of the preferred embodiment.

Referring to FIG. 4, an exemplary ONEOF instruction sequence is shown starting at block 400. The jump condition (JMP CONDITION) is evaluated as indicated at block 402. Checking for a true or false condition is performed as indicated at decision block 404. If one or true, the next instruction pointer is set to IP+2 as indicated at block 406. If zero or false, the next instruction pointer is set to IP+1 as indicated at block 408. Then next next IP is set to IP+3 as indicated at a block 410. Then use_next_next_IP is set to true or one as indicated at a block 412. This completes the ONEOF instruction sequence as indicated at block 414.

The following TABLES 2 AND 3 illustrate the operation of the ONEOF instruction of the preferred embodiment.

TABLE 2

PSEUDO CODE SEQUENCE OF THE PREFERRED EMBODIMENT if condition = true then
    next_ip = ip + 1
    next_next_ip = ip + 3
  else
    next_ip = ip + 2

Once the next instruction pointer is calculated, the next instruction is loaded and executed. The next instruction pointer when loaded overrides the normal instruction pointer calculation. This allows only one of the next two instructions to be executed. So the above example code sequence from TABLE 1 becomes the following example ONEOF code sequence of the preferred embodiment set forth in TABLE 3:

TABLE 3

EXAMPLE ONEOF CODE SEQUENCE OF
THE PREFERRED EMBODIMENT oneof cond
  instr_x
  instr_y
  next_instr The instruction space has been reduced by one instruction, and the execution time for each leg of code is constant at two cycles. This reduction of instruction space provided by the code sequence of the preferred embodiment is a critical feature for processing multiple protocols with for example, a maximum of 32 instructions. The cycle savings also becomes critical with 622 Mbps or Gigabit Ethernet speeds.

Figure 5:
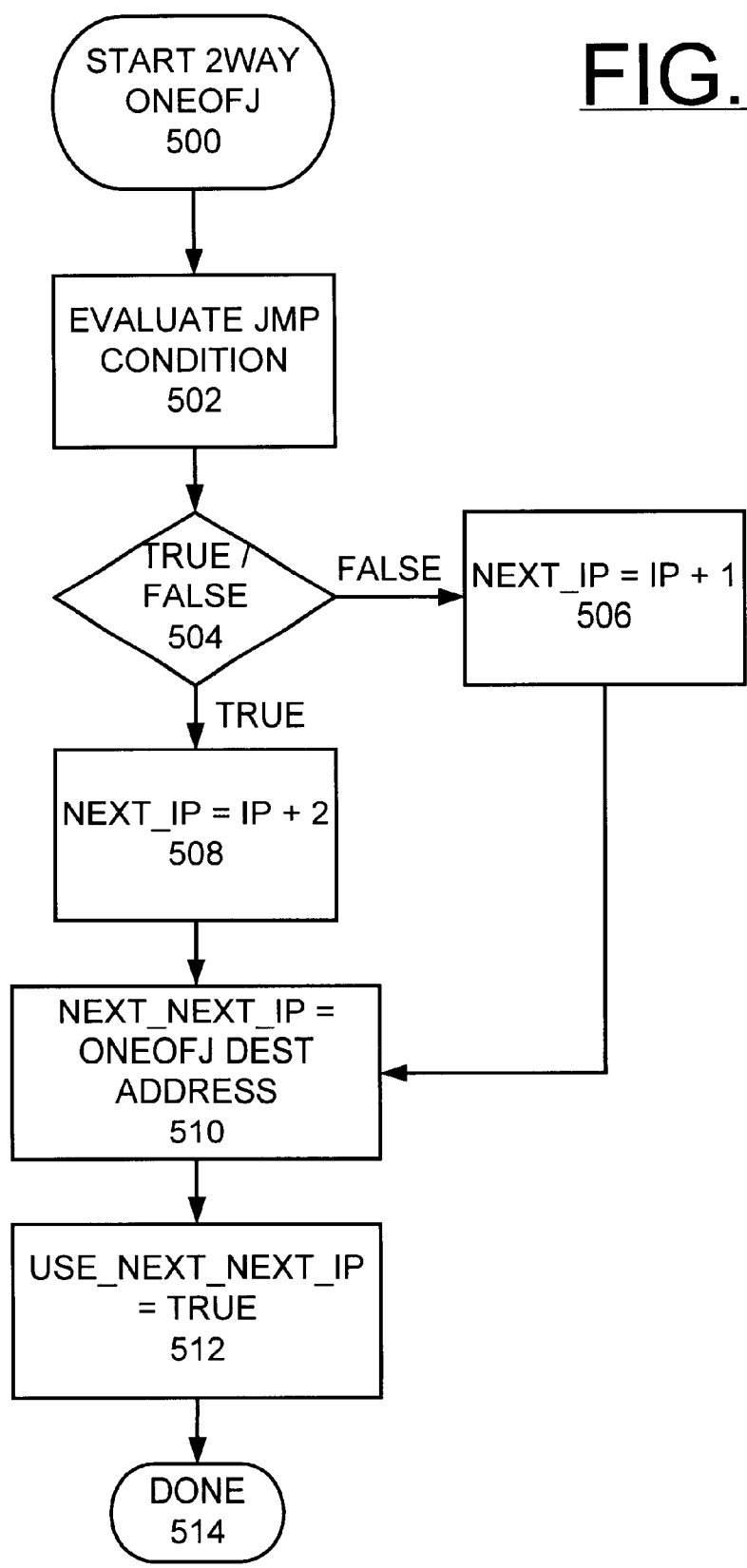

Referring to FIG. 5, for multi-way decisions an exemplary ONEOFJ instruction sequence is shown starting at block 500. The jump condition (JMP CONDITION) is evaluated as indicated at block 502. Checking for a true or false condition is performed as indicated at decision block 504. If zero or false, the next instruction pointer is set to IP+1 as indicated at block 506. If one or true, the next instruction pointer is set to IP+2 as indicated at block 508. A next next instruction pointer NEXT_NEXT_IP is set to the ONEOFJ destination address as indicated at block 510. Then USE_NEXT_NEXT_IP is set to true as indicated at block 512. This completes the ONEOFJ instruction sequence as indicated at block 514.

The following TABLE 4 example pseudo code shows how the ONEOFJ instruction works.

TABLE 4

EXAMPLE ONEOFJ PSEUDO CODE SEQUENCE
OF THE PREFERRED EMBODIMENT

```
if condition = true then
    next_ip = ip + 1
else
    next_ip = ip + 2
next_next_ip = jump_dest
```

A basic difference is that the eventual destination is specified in the instruction instead of being fixed after the third instruction. This essentially allows the one of instruction to be nested, and allows a code sequence like the following example to be implemented. with the example pseudo code sequence of TABLE 5:

```
if cond1 then
    do a
else if cond2
    do b
else if cond3
    do c
else
    do d
```

TABLE 5

EXAMPLE ONEOF and ONEOFJ PSEUDO CODE
SEQUENCE OF THE PREFERRED EMBODIMENT

```
            oneofj cond1, nextAddr
            instr_a
            oneofj cond2, nextAddr
            instr_b
            oneof cond3
            instr_c
            instr_d
nextAddr:   next_instr
```

While the following example illustrates a conventional code sequence for the above example.

```
            jmp cond1,do_a
            jmp cond2,do_b
            jmp cond3,do c
do_d:       instr_d
            jmp around
do_c:       instr_c
            jmp around
do_b:       instr_b
            jmp around
do_a:       instr_a
around:     next_instr
```

Note the reduced instruction space required for the code sequence of the preferred embodiment using the ONEOF and ONEOFJ instructions of TABLE 5, as compared to the convention code above.

Figure 6:
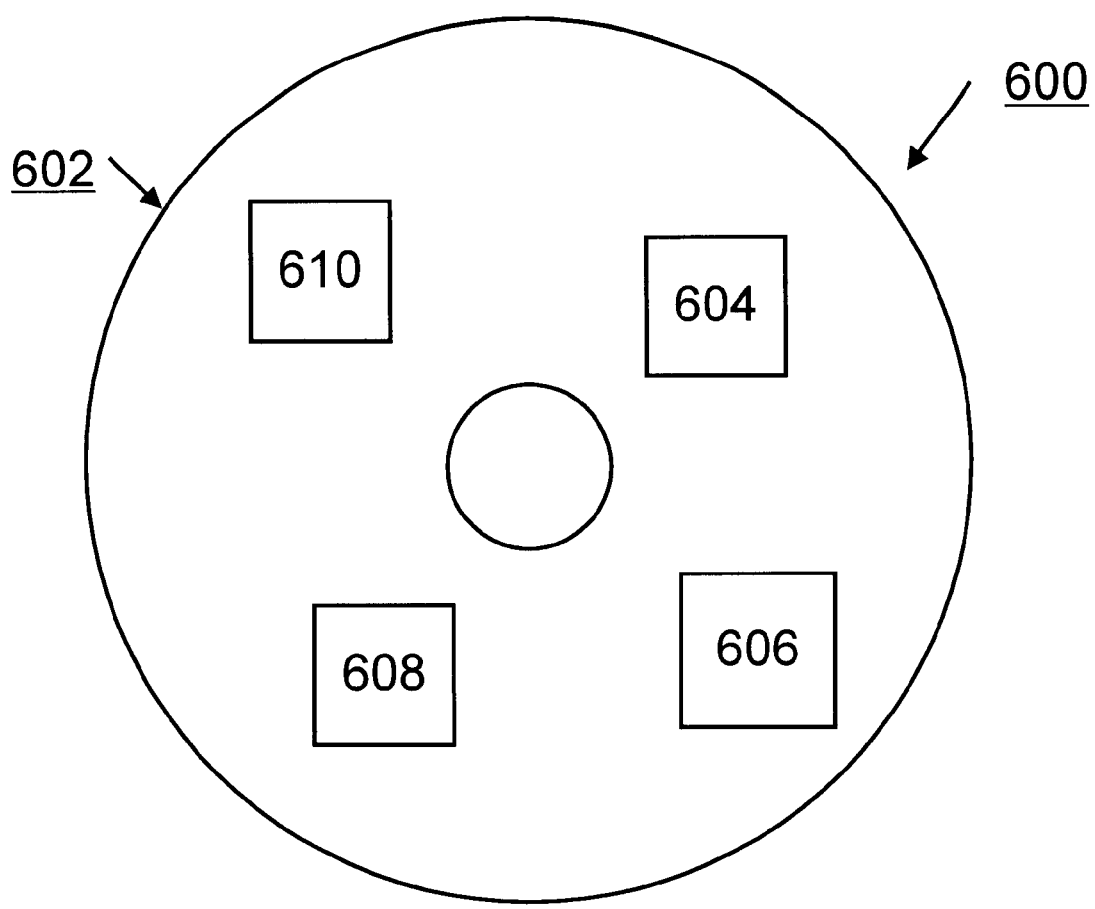
FIG. 6 is a block diagram illustrating a computer program product in accordance with the invention.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying put the data communications processing methods using ONEOF and ONEOFJ instructions of the preferred embodiment.

A sequence of program instructions or a logical assembly of one or more interrelated modules defined by the recorded program means 604, 606, 608, 610, direct nano-processor 200 for carrying out the data communications processing with ONEOF and ONEOFJ instructions of the preferred embodiment.

While the present invention has been described with reference to the details of the embodiments of the invention shown in the drawing, these details are not intended to limit the scope of the invention as claimed in the appended claims.

What is claimed is:

1. A method for processing data communications in a communications system using a small processor including an arithmetic logic unit (ALU) and an instruction memory, said method comprising the steps of:

evaluating a one-of instruction control;

responsive to a false one-of instruction control, updating an instruction pointer to a first instruction pointer;

responsive to a true one-of instruction control, updating an instruction pointer to a second instruction pointer; and evaluating a one-of-and-jump instruction control.

2. The method for processing data communications in a communications system as recited in claim 1 further includes steps of responsive to a false one-of-and-jump instruction control, updating said instruction pointer to a first instruction pointer; and responsive to a true one-of-and-jump instruction control, updating said instruction pointer to a second instruction pointer.

3. The method for processing data communications in a communications system as recited in claim 2 further includes a step of updating said instruction pointer to a one-of-and-jump destination address.

4. The method for processing data communications in a communications system as recited in claim 1 further includes a step of applying said instruction pointer to the instruction memory.

5. The method for processing data communications in a communications system as recited in claim 4 further includes a step of loading and executing a corresponding instruction in the ALU for said instruction pointer applied to the instruction memory.

6. Apparatus for processing data communications in a communications system comprising:

an arithmetic logic unit (ALU);

an instruction pointer (IP) register;

an instruction memory coupled to said arithmetic logic unit (ALU); said instruction memory applying a current instruction to said ALU responsive to an instruction pointer (IP) coupled from said instruction pointer (IP) register; and a next instruction pointer (IP) generation logic coupled to said arithmetic logic unit (ALU) receiving a jump result control; said next instruction pointer (IP) generation logic generating a next instruction pointer (IP); said next instruction pointer (IP) generation logic including a first multiplexer receiving a one-of instruction control; said first multiplexer receiving a true input and a false input and providing a selected output responsive to said one-of-instruction control;

an adder providing a result; said adder having a first input receiving a selected output of said first multiplexer and having a second input receiving a current instruction pointer; and said adder result corresponding to said next instruction pointer (IP) coupled to said instruction pointer register.

7. Apparatus for processing data communications in a communications system as recited in claim 6 wherein said next instruction pointer (IP) generation logic further includes a second multiplexer receiving a one-of-and-jump destination instruction pointer and said adder result input and providing a selected output responsive to a one-of-and-jump instruction control.

8. Apparatus for processing data communications in a communications system as recited in claim 7 wherein said selected output of said second multiplexer is applied to said instruction pointer (IP) register.

9. A computer program product for use with an embedded processor for processing receive and transmit data communications in a communications system, the computer program product comprising:

a recording medium;

a one-of instruction, recorded on said recording medium, for providing a next instruction pointer, and a one-of-and-jump instruction, recorded on said recording medium, for providing a next instruction pointer and a next next jump destination instruction pointer.

* * * * *